3,266,181
SOIL LEVELLING AND DIKING MACHINE
Walter Olafson, Box 5, Rolling Hills, Alberta, Canada
Filed June 8, 1964, Ser. No. 373,337
3 Claims. (Cl. 37—169)

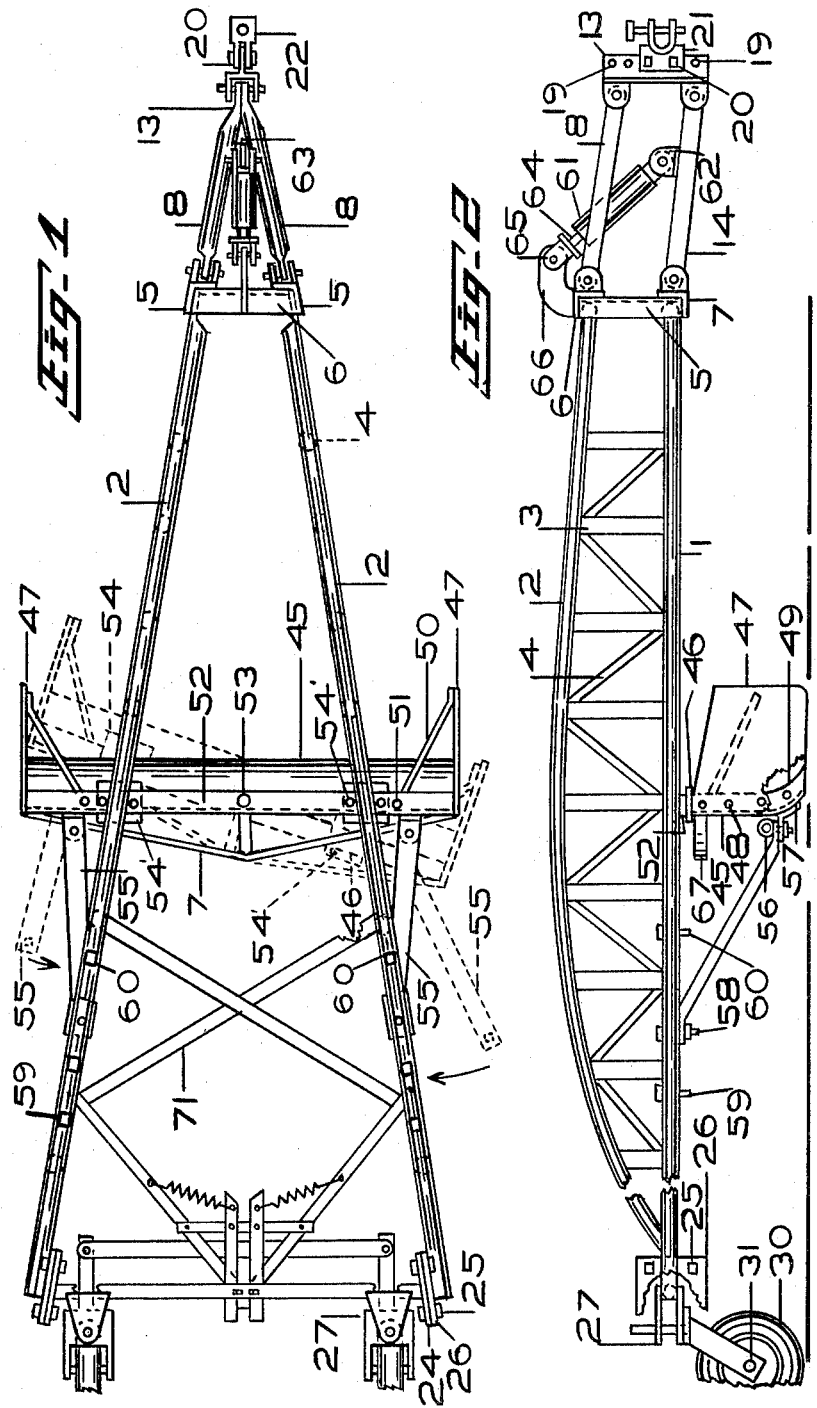

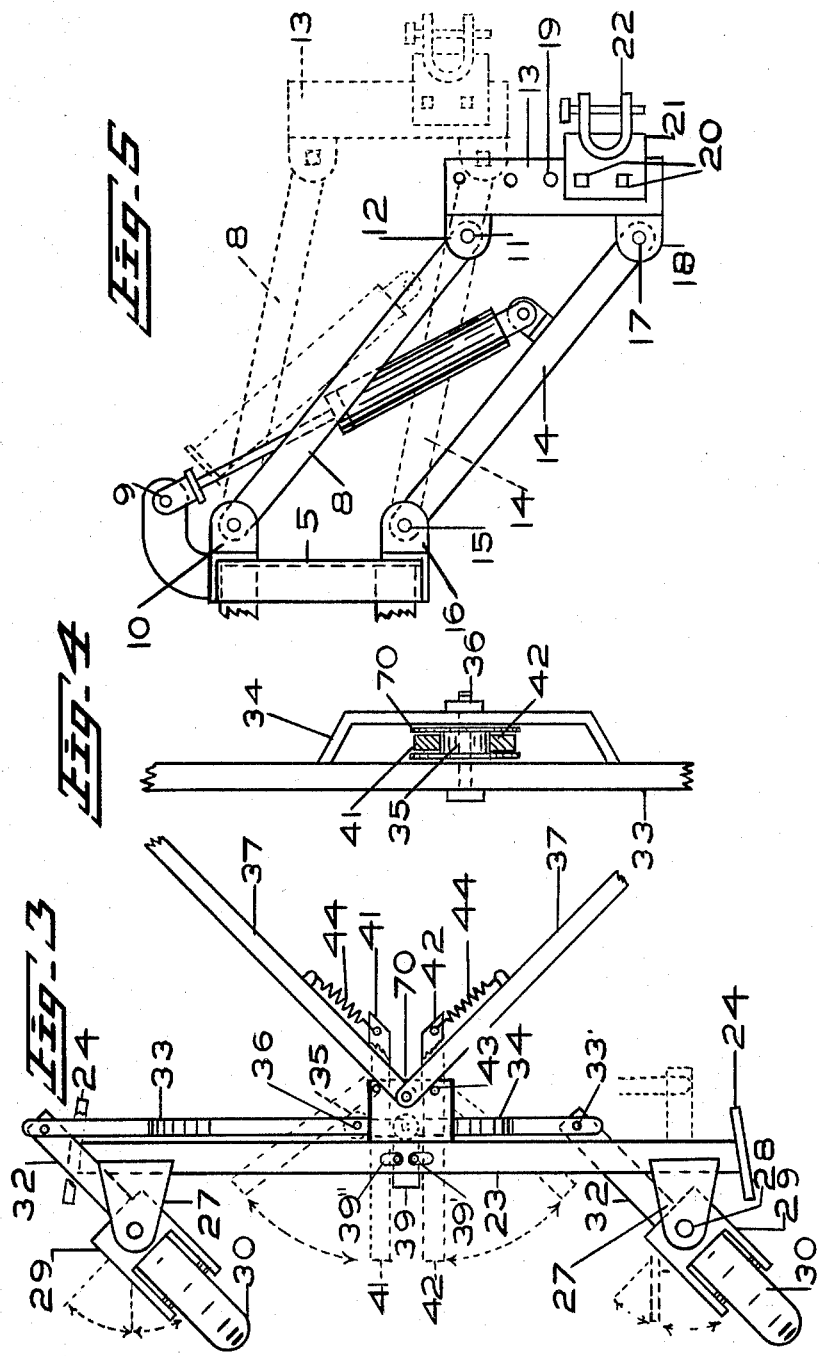

This invention relates to land levelling machines, having particular reference to a machine of this character for use in irrigation farming to obtain better water spread in flood irrigating and for border diking.

In the art to which the invention relates, land levellers are in use that employ an elongated truss frame rearwardly wheel supported and forwardly supplied with a tractor hitch, and carrying transversely suspended below the frame a levelling blade.

The present invention is concerned with improvements in land levellers of this character, both in the construction of the frame to eliminate up and down center motion and to provide an improved castor wheel unit rearwardly supporting the frame for easier turning with the blade in the ground, including a semi-locking trip device for the castor wheels tie bar that holds the wheels rigid enough to prevent dog trailing as may occur when the levelling blade is more heavily loaded with dirt on one side than on the other. There is also provided a lifting attachment for the forward end of the frame by which the frame can be raised and lowered, permitting use of a rigidly mounted levelling blade and depth adjustment.

Other features and advantages of the invention will become apparent by reference to the accompanying description taken in conjunction with the drawings.

In the drawings, wherein is illustrated a preferred embodiment of the invention, FIG. 1 is a top plan view of a land levelling machine embodying my improvements, with the truss frame omitted and showing in dashed lines the position of the levelling blade and blade connecting arms when the blade is turned at an angle in relation to the ground.

FIG. 2 is a side view of the machine, with parts broken away, and shown in working relation to the ground.

FIG. 3 is an enlarged top view of the castor wheel unit taken by itself, shown with the wheels turned and the position of one of the wheels before turning indicated by dashed lines and with the direction of movement of the wheels indicated by arrows, the brace bars for the unit being shown broken away.

FIG. 4 is an enlarged side view of the tie bar, broken away, including the roller for engaging the trip bars and the bracket mounting the roller, and with an arrow indicating the direction of movement of the tie bar.

FIG. 5 is an enlarged side view of the hitch connection for the machine, including fragments of the frame, shown as it would appear with the forward end of the frame elevated, and with the position of the hitch connecting elements indicated in dashed lines when the machine is lowered.

Having reference to the drawings, the frame for the machine, as is common in the art, includes rearwardly diverging side frame bars 1, with truss bar 2 and uprights 3 reinforced by braces 4, the truss bars rearwardly connecting to the side frame bars, and forwardly attaching to uprights, as at 5, that are connected by top and bottom angle plates 6 and 7.

To the top plates 6 pivotally attach arms 8 on pins 9 engaging lugs 10, the arms pivotally attaching by pins 11 to lugs 12 on a hitch plate 13. The bottom angle plate 7 has arms, as at 14, pivotally attaching by pins, as at 15, to lugs, as at 16, the arms forwardly pivotally attaching by pins 17 to lugs 18 on the lower portion of the plate 13.

The hitch plate 13 includes a series of openings 19 for engagement of bolts 20 for adjustable attachment of a plate 21 to which is integrally fixed a clevis 22 for engagement by a tractor.

Rearwardly the truss frame is supported on a castor wheel unit, as separately shown in FIGURE 3. This unit includes a cross bar 23 to ends of which are welded plates 24 that are attachable by bolts 25 (FIGS. 1 and 2) to plates 26 that are welded to the insides of the frame bars 1.

To the cross frame bar 23 are fixed at each end, as by welding, upper and lower pairs of castor wheel mounting plates 27 in each pair of which is free to turn a shank 28 fixed upstanding on a fork 29 that has mounted therein a castor wheel 30 on an axle 31. To the forks 29 are integrally fixed forwardly extending arms 32 that are connected by a tie bar 33 pivotally attaching by pins 33'. The arms 32 attach to the forks 29 off center inward on the forks to give greater castoring to the outside wheel when turning.

The tie bar 33 has a bracket 34 (FIG. 4) between which and the tie bar is mounted a roller 35 on a pin 36.

A pair of brace bars 37 forwardly attach to the frame bars 1 and rearwardly attach to a plate 70 fixed to the under side of the cross bar 23, a bumper block 39 is attached by bolts 39' to the under side of the cross bar 23 engaging in elongated openings 39" in the cross bar for lateral adjustment of the block.

To the plate 70 are pivoted trip bars 41 and 42 on bolts 43, the trip bars forwardly attaching by coiled springs 44 to the brace bars 37, the springs normally holding the trip bars rearwardly bearing against the bumper block 39 with the castor wheels traveling straight ahead. When the castor wheels swing in either direction the roller 35 bears against one or other of the trip bars 41 and 42, pivoting the trip bar on its bolt 43 and expanding the spring 44 to which it is attached, as in FIGURE 3.

The levelling blade 45 for the machine includes a top bar 46 integrally fixed thereto and end plates 47 attached by bolts 48 to end flanges on the blade, as at 49, to be removable therefrom for soil roll out in diking and like work, the side plates including brace bars 50 forwardly fixed thereto and rearwardly attached, as by bolts 51, to the bar 46.

Between the frame bars 2 is fixed a cross bar 52 to which the blade top bar 46 is pivotally attached by a pin 53 with the blade free to swing laterally. Included are wear plates 54 on the top bar 46 of the blade and opposing wear plates 54' on the under sides of the frame bars 1.

The blade is rigidly held to the frame for working by rear connecting bars 55 pivotally attaching by pins 56 to lugs 57 fixed to the lower part of the blade, the bars 55 being engageable on pins 58 on the frame bars 1 held thereon, as by cotter pins. In this position the blade is held as in FIG. 1 at right angles to the frame, but the blade may be shifted for angle work as shown by the dashed lines, for which pins 59 and 60 are provided in the frame bars 1 forwardly and rearwardly of the pins 58 and to which the bars 55 are attachable. The blade is reinforced by a truss 67 and the frame bars 1 may be reinforced by cross braces 71.

In the use of the machine, for raising and lowering the blade 45 a hydraulic element 61 is used, anchored to lugs 62 attached to a cross plate 63 (FIG. 1) between the arms 14 and having a piston rod 64 pivotally attaching by a coupling 65 to an arm 66 fixed on the upper angle plate 6, the hydraulic element raising the forward end of the frame, as shown in full lines in FIGURE 5, and lowering it to the position shown in dashed lines. Further adjustment is provided by the hitch plate 13 to which the clevis plate 21 is attached to be adjustable vertically.

The castor wheels 30 are held for travel straight ahead by the springs 44. When a turning movement of the implement is made the roller bears against one or other of the bars 41 and 42, which expands the spring 44 to which the bar is attached. When the turn is completed the castor wheels straighten out and the expanded spring 44 pulls the bar 41 or 42 back into engagement with the bumper block 39.

What is claimed is:

1. In a land levelling machine having an elongated truss frame, with a transverse land levelling blade horizontally suspended thereunder, for swinging movement thereon; a linkage between the front of the frame and a tractor-supporting hitch plate; power operable means on the linkage to raise and lower the front end of the frame on the hitch plate; a pair of spaced caster wheels supporting the rear of the frame, and each provided with a crank; a tie bar pivotally connecting the cranks of the caster wheels for synchronized turning of same; a pair of normally parallel trip bars, each pivotally mounted on the frame; one end of each trip bar spring loaded against a roller positioned therebetween, and rotatably carried by the tie bar; said spring loaded trip bars normally and resiliently maintaining the caster wheels lengthwise aligned with the frame, and prevented from dog trailing, when said machine is operating; a pair of adjusting bars, each having one end connected to one end of the blade; and the other ends of said latter bars connected to the frame, for holding the blade in adjusted positions across the frame.

2. In a machine, as set out in claim 1, wherein the truss frame includes upper truss bars extending lengthwise in spaced relation with lower frame side bars; means associated with the linkage by which the forward end of the frame may be raised and lowered; said means including pairs of upper and lower front-converging hitch bars, each pair end-pivoted on the hitch plate, and the rear diverging ends of said hitch bars pivotally attaching respectively to the upper truss bars and the lower frame side bars; an upstanding arm mounted on the forward end of the truss frame; and said power operable means consisting of a hydraulic element pivotally anchored to the lower hitch bars and pivotally connected to the upstanding arm, for raising and lowering the forward end of the machine in relation to the hitch plate.

3. In a land levelling machine as set out in claim 1, wherein the trip bar control for the rear support caster wheels include a plate carried by the frame and pivotally supporting said trip bars therebelow; a bumper block carried below said plate, between the trip bars, and at the ends thereof remote from the spring loading; and said tie bar roller positioned centrally between the trip bars, for separate end-shifting by the turning of the caster wheels to swing one of said trip bars away from the bumper block, against said spring loading; and means for endwise adjustment of the bumper block.

References Cited by the Examiner
UNITED STATES PATENTS

| | | | |
|---|---|---|---|
| 1,181,954 | 5/1916 | Mishler | 280—94 |
| 1,221,761 | 4/1917 | McGrew | 280—94 |
| 1,495,229 | 5/1924 | Libby | 280—94 |
| 2,459,591 | 1/1949 | Shumaker | 37—146 |
| 2,593,880 | 4/1952 | Heavilin | 37—169 |
| 2,646,850 | 7/1953 | Brown | 280—94 X |
| 2,659,166 | 11/1953 | Mathias | 37 |
| 2,662,314 | 12/1953 | Lindeman | 37—180 |
| 2,780,158 | 2/1957 | Pursche | 172—413 X |
| 2,806,306 | 9/1957 | Peterson | 37—153 |
| 2,843,948 | 7/1958 | Lindeman | 37—178 |
| 2,866,281 | 12/1958 | Breaux | 172—328 X |
| 2,880,528 | 4/1959 | Lusk | 37—169 |
| 3,141,250 | 7/1964 | Eddins | 37—180 |

ABRAHAM G. STONE, *Primary Examiner.*

JOE O. BOLT, JR., *Examiner.*